J. M. OWENS.
TENSION DEVICE FOR WIRE SAWS.
APPLICATION FILED NOV. 21, 1908.
946,807.
Patented Jan. 18, 1910.
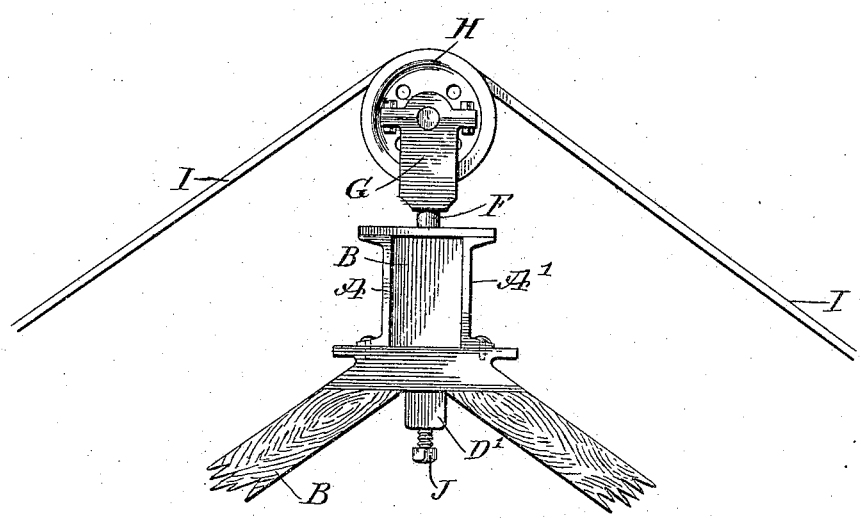
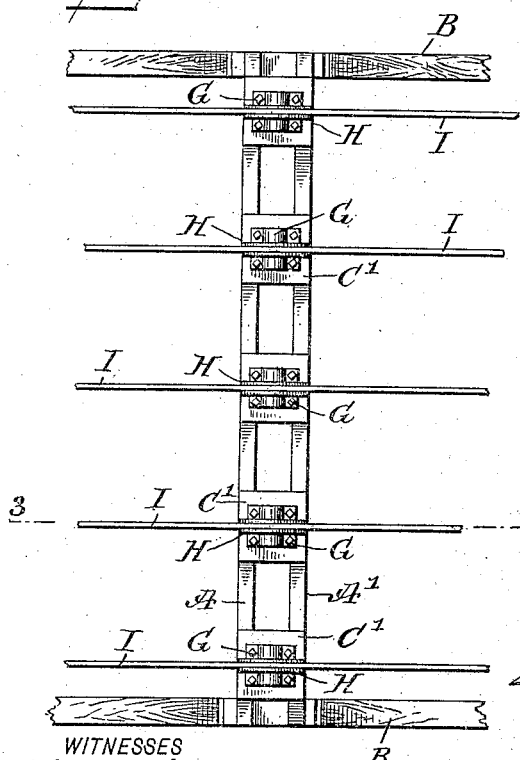
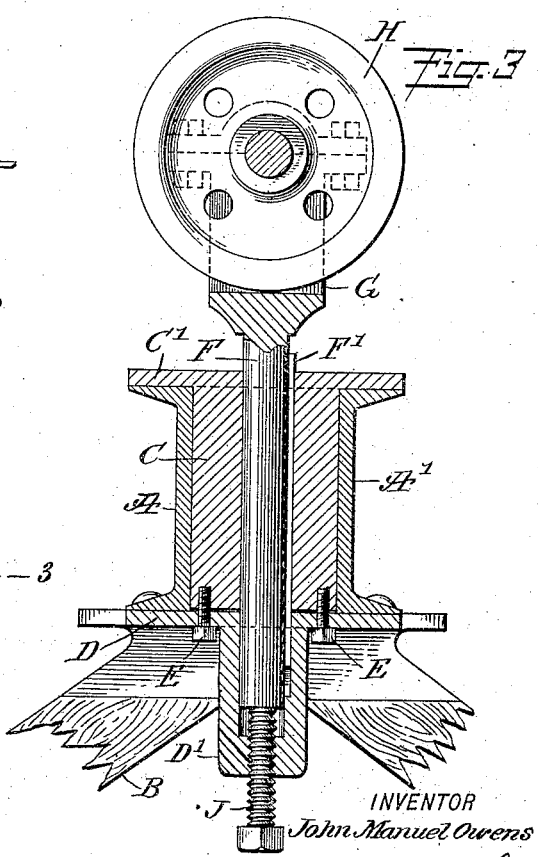
WITNESSES
INVENTOR
John Manuel Owens
BY
ATTORNEYS

UNITED STATES PATENT OFFICE.

JOHN MANUEL OWENS, OF OOLITIC, INDIANA, ASSIGNOR TO JOHN MANUEL OWENS, OF OOLITIC, INDIANA, AND JOHN A. ROWE, OF BEDFORD, INDIANA.

TENSION DEVICE FOR WIRE SAWS.

946,807.     Specification of Letters Patent.     Patented Jan. 18, 1910.

Application filed November 21, 1908. Serial No. 463,767.

*To all whom it may concern:*

Be it known that I, JOHN MANUEL OWENS, a citizen of the United States, and a resident of Oolitic, in the county of Lawrence and State of Indiana, have invented a new and Improved Tension Device for Wire Saws, of which the following is a full, clear, and exact description.

The invention relates to stone-sawing machines, such as shown and described in the Letters Patent of the United States, No. 884,949, granted to me April 14, 1908.

The object of the present invention is to provide a new and improved tension device for wire saws of stone-sawing machines, arranged to permit convenient vertical and horizontal adjustment of the sheave or pulley, over which passes the endless wire saw, to give the wire saw the necessary tension and to bring the wire saw into proper position according to the thickness of the slab to be cut from the stone block.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied; Fig. 2 is a plan view of the same; and Fig. 3 is an enlarged sectional side elevation of the same on the line 3—3 of Fig. 2.

The channel beams A, A' are mounted on the side frames of the carriage B and are spaced apart to receive between them blocks C, each having top flanges C' resting on top of the channel beams A, A'. Across the bottoms of the channel beams A, A' and across the corresponding blocks C extends a bottom plate D fastened by bolts E to the corresponding block C so as to clamp this block in position on the channel beams A, A' after the block has been shifted transversely along the beams A, A' to a desired position according to the thickness of the slab to be cut from the stone block.

Each of the blocks C is provided with a central vertically-disposed aperture for the reception of the stem F of a bearing G, in which is journaled the sheave or pulley H, over which passes the corresponding wire saw I, as plainly indicated in Figs. 1 and 2. The lower end of the stem F extends into a pocket D' formed on the bottom plate D, and the bottom of the stem F rests on a screw J screwing in the bottom of the pocket D'. Now by screwing the screw J upward or downward, the stem F and with it the bearing G and the sheave or pulley H can be raised or lowered, so as to give the desired tension to the wire saw I. The stem F is prevented from turning in the block C and the pocket D', and for this purpose the stem F is preferably provided with a key F' engaging corresponding key-ways in the block C and the pocket D', as plainly indicated in Fig. 3. Now from the foregoing it will be seen that by the arrangement described any one of the blocks C can be adjusted transversely on the channel beams A, A' by first loosening the bolts E, and when the desired position has been reached the block C is firmly clamped in position on screwing up the bolts E, so as to cause the bottom plate D to clamp the block C in place on the channel beams A, A'. Thus the wire saw I can be shifted bodily in a transverse direction according to the thickness of the slab to be cut from the stone block. By the operator turning the screw J, the sheave H can be raised or lowered, as previously explained, so as to give the desired tension to the wire saw I.

The device shown and described is very simple and durable in construction and can be readily applied to stone-sawing machines of the character previously mentioned.

Having thus described my invention, I claim as new and desire to secure by Letters Patent:

1. A tension device for wire saws, comprising a sheave, a bearing in which the said sheave is journaled, the said bearing having a stem, a block in which the said stem is mounted to slide up and down, means for adjusting the stem vertically, a support on which the said block is adjustable horizontally, and means for securing the block in the adjusted position on said support.

2. A tension device for wire saws, comprising a sheave, a bearing in which the said sheave is journaled and having a stem, a block having a bottom plate and in which the said stem is mounted to slide up and down, a set screw screwing in the said bottom plate and on which rests the bottom of the said stem, and a pair of transversely-extending spaced beams on which the said block is mounted to slide.

3. A tension device for wire saws of stone-sawing machines, comprising spaced beams, a block fitting between the said beams and having top flanges resting on top of the said beams, a bottom plate extending across the bottom of the said beams and the said block, bolts for fastening the said bottom plate to the said block and for clamping the bottom plate to the said beams, a sheave, and a bearing for the sheave having a stem vertically adjustable in the said block.

4. A tension device for wire saws of stone-sawing machines, comprising spaced beams, a block fitting between the said beams and having top flanges resting on top of the said beams, a plate extending across the bottom of the said beams and the said block, bolts for fastening the said bottom plate to the said block and for clamping the bottom plate to the said beams, a sheave, a bearing in which the said sheave is journaled, a stem on the bearing and engaging the said block, and a screw in the said bottom plate and on which rests the said stem.

5. A tension device for wire saws, comprising a support, spaced beams mounted at their ends on said support, blocks fitting between the said beams and adjustable thereon, the said blocks having top flanges resting on top of the beams, bottom plates extending across the bottoms of the said beams and across the corresponding blocks, means for fastening the bottom plates to the corresponding blocks and for clamping the bottom plates to the said beams, bearings having stems extending through said blocks, the said bottom plates having pockets into which the lower ends of the stems extend, screws screwing in the bottoms of the pockets and on which the bottoms of the said stems rest, and sheaves journaled in the said bearings and over which the wire saws are adapted to pass.

In testimony whereof I have signed my name to this specification in the presence of two subscribing witnesses.

JOHN MANUEL OWENS.

Witnesses:
W. E. CLARK,
H. D. ORCHARD.